United States Patent
Freeman et al.

(10) Patent No.: US 12,236,358 B2
(45) Date of Patent: Feb. 25, 2025

(54) SYSTEMS AND METHODS FOR COMBINING MODEL INTERPRETERS

(71) Applicant: Verint Americas Inc., Alpharetta, GA (US)

(72) Inventors: Cynthia Freeman, Albuquerque, NM (US); Abhinav Aggarwal, Albuquerque, NM (US)

(73) Assignee: Verint Americas Inc., Alpharetta, GA (US)

( * ) Notice: Subject to any disclaimer, the term of this patent is extended or adjusted under 35 U.S.C. 154(b) by 488 days.

(21) Appl. No.: 16/867,012

(22) Filed: May 5, 2020

(65) Prior Publication Data

US 2020/0356877 A1 Nov. 12, 2020

Related U.S. Application Data

(60) Provisional application No. 62/843,661, filed on May 6, 2019.

(51) Int. Cl.
*G06N 5/04* (2023.01)
*G06N 20/20* (2019.01)

(52) U.S. Cl.
CPC ............... *G06N 5/04* (2013.01); *G06N 20/20* (2019.01)

(58) Field of Classification Search
CPC .................................. G06N 5/04; G06N 20/20
See application file for complete search history.

(56) References Cited

U.S. PATENT DOCUMENTS

| | | | |
|---|---|---|---|
| 9,036,806 B1* | 5/2015 | Bourdaillet | G06Q 10/04 379/265.09 |
| 10,542,148 B1* | 1/2020 | Merritt | G06Q 10/0635 |
| 2016/0328253 A1* | 11/2016 | Majumdar | G06N 3/126 |
| 2018/0349738 A1 | 12/2018 | Fujimaki et al. | |
| 2019/0219994 A1* | 7/2019 | Yan | G05B 13/027 |
| 2020/0066407 A1* | 2/2020 | Stumpe | G06T 7/0012 |
| 2020/0134398 A1* | 4/2020 | Kruk | G06V 30/40 |

(Continued)

OTHER PUBLICATIONS

Laugel, T., et al., "Defining Locality for Surrogates in Post-hoc Interpretablity," arXiv.org:1806.07498v1, ICML Workshop on Human Interpretability in Machine Learning, Stockholm, Sweden, 2018, pp. 47-53.

(Continued)

*Primary Examiner* — Courtney Harmon
(74) *Attorney, Agent, or Firm* — Meunier Carlin & Curfman LLC

(57) ABSTRACT

Systems and methods are described to combine two or more linear models into a combined linear model. Two or more linear models and an observation of interest are selected. The linear models are concurrent with respect to the observation of interest. The observation of interest includes a class value and a feature vector. A distance is selected, and a plurality of feature vectors are selected that are within the distance of the feature vector associated with the observation of interest. These feature vectors are input to the selected linear models and a plurality of class values are generated. These class values and the selected feature vectors are used to generate a combined linear model. The combined model is either a mean local linear surrogate model or a linearly weighted local surrogate model.

11 Claims, 4 Drawing Sheets

(56) References Cited

U.S. PATENT DOCUMENTS

2020/0233924 A1\* 7/2020 George ............... G06F 40/186
2020/0279140 A1\* 9/2020 Pai .................... G06F 11/3447

OTHER PUBLICATIONS

International Search Report and Written Opinion, dated Jul. 24, 2020, received in connection with corresponding International Patent Application No. PCT/US2020/031481.

Hall, P., Gill, N., Kurka, M., and Phan, W. Machine Learning Interpretability with H2O Driverless AI, 2017.

Ribeiro, M. T., Singh, S., and Guestrin, C. Why Should I Trust You?: Explaining the Predictions of Any Classi€er. In Proceedings of the 22nd ACM SIGKDD international conference on knowledge discovery and data mining (2016), ACM, pp. 1135-1144.

\* cited by examiner

SYSTEMS AND METHODS FOR COMBINING MODEL INTERPRETERS

CROSS-REFERENCE TO RELATED APPLICATIONS

This application claims the benefit of priority to U.S. Provisional Patent Application No. 62/843,661 filed on May 6, 2019, entitled "Locally-Faithful Ensembles of Model-Agnostic Interpretations," the contents of which are hereby incorporated by reference in its entirety.

BACKGROUND

Machine learning interpretability is essential in understanding why a classifier makes its decisions and is vital to public trust. Existing techniques exploit the fact that complex non-linear classifier boundaries can be approximated by linear boundaries in a small neighborhood around a given data point (called the observation of interest). These linear surrogate models serve as the interpretation for the classifier around the data point.

To create these linear boundaries, a sampling scheme is often used where nearby points and their respective classifier outputs serve as training data for the surrogate model. This can lead to different boundaries (or interpretations) especially when the algorithm is run multiple times.

SUMMARY

Systems and methods are described to combine two or more linear models into a combined linear model. Two or more linear models and an observation of interest are selected. The linear models are concurrent with respect to the observation of interest. The observation of interest includes a class value and a feature vector. A distance is selected, and a plurality of feature vectors are selected that are within the distance of the feature vector associated with the observation of interest. These feature vectors are input to the selected linear models and a plurality of class values are generated. These class values and the selected feature vectors are used to generate a combined linear model. The combined model is either a mean local linear surrogate model or a linearly weighted local linear surrogate model.

In an embodiment, a method for determining a surrogate model from a plurality of models is provided. The method includes: receiving a plurality of models by a computing device, wherein each model receives as an input a feature vector and generates a class based on the input feature vector; receiving an observation of interest by the computing device, wherein the observation of interest includes a feature vector and a class; determining a neighborhood of feature vectors by the computing device, wherein the neighborhood of feature vectors comprises a plurality of feature vectors; and determining a surrogate model for the plurality of models based on the neighborhood of feature vectors and the plurality of models by the computing device.

Embodiments may include some or all of the following features. The method may further include determining a heatmap based on the determined surrogate model. The surrogate model may be one or more of a mean local linear surrogate model or a linear weighted local linear surrogate model. The models of the plurality of models may be concurrent at the observation of interest. The method may further include receiving a distance and determining the neighborhood of feature vectors based on the received distance. Determining the neighborhood of feature vectors may include determining the plurality of feature vectors that are within the received distance of the feature vector of the observation of interest. Determining the surrogate model for the plurality of models based on the neighborhood of feature vectors and the plurality of linear models may include: for each linear model of plurality of linear models, generating a class for each feature vector of the plurality of the neighborhood of feature vectors; and determining the surrogate model using the classes generated by each linear model for each feature vector of the neighborhood of feature vectors. The models of the plurality of models may be linear models.

In an embodiment, a system for determining a surrogate model from a plurality of models is provided. The system includes at least one processor and a non-transitory computer readable medium storing instructions. The instructions when executed by the at least one processor cause the at least one processor to: receive a plurality of models, wherein each model receives as an input a feature vector and generates a class based on the input feature vector; receive an observation of interest, wherein the observation of interest includes a feature vector and a class; determine a neighborhood of feature vectors, wherein the neighborhood of feature vectors comprises a plurality of feature vectors; and determine a surrogate model for the plurality of models based on the neighborhood of feature vectors and the plurality of models.

Embodiments may include some or all of the following features. The system may further include instructions that when executed by the at least one processor cause the at least one processor to determine a heatmap based on the determined surrogate model. The surrogate model may be one or more of a mean local linear surrogate model or a linear weighted local linear surrogate model. The models of the plurality of models may be concurrent at the observation of interest. The system may further include instructions that when executed by the at least one processor cause the at least one processor to: receive a distance; and determine the neighborhood of feature vectors based on the received distance. Determining the neighborhood of feature vectors may include determining the plurality of feature vectors that are within the received distance of the feature vector of the observation of interest. Determining the surrogate model for the plurality of models based on the neighborhood of feature vectors and the plurality of linear models may include: for each linear model of plurality of linear models, generating a class for each feature vector of the plurality of the neighborhood of feature vectors; and determining the surrogate model using the classes generated by each linear model for each feature vector of the neighborhood of feature vectors. The models of the plurality of models may be linear models.

In an embodiment, a non-transitory computer readable medium is provided. The computer readable medium stores instructions that when executed by at least one processor cause the at least one processor to: receive a plurality of models, wherein each model receives as an input a feature vector and generates a class based on the input feature vector; receive an observation of interest, wherein the observation of interest includes a feature vector and a class; determine a neighborhood of feature vectors, wherein the neighborhood of feature vectors comprises a plurality of feature vectors; and determine a surrogate model for the plurality of models based on the neighborhood of feature vectors and the plurality of models.

Embodiments may include some or all of the following features. The computer readable medium may further include instructions that when executed by the at least one processor cause the at least one processor to determine a heatmap based on the determined surrogate model. The surrogate model may be one or more of a mean local linear surrogate model or a linear weighted local linear surrogate model. The models of the plurality of models may be concurrent at the observation of interest.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
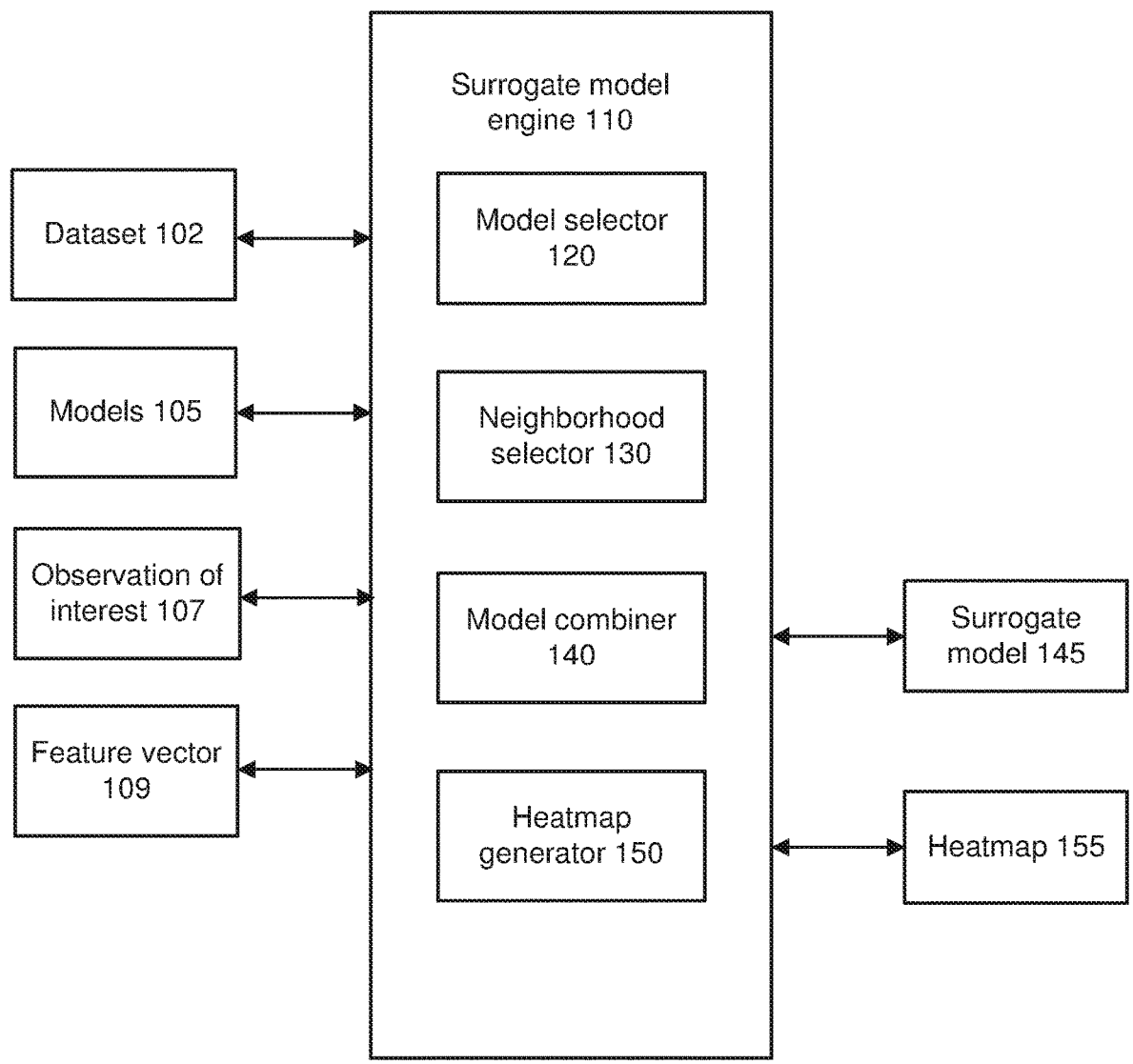
FIG. 1 is an illustration of an exemplary environment for determining a surrogate model.

FIG. 1 is an illustration of an exemplary environment 100 for determining a surrogate model. The environment 100 includes a surrogate model engine 110 that is adapted to generate a surrogate model 145 using two or more models 105. The models 105 may be linear models 105 (also referred to as classifiers) and may have been trained using feature vectors 109 from a dataset 102. Depending on the embodiment, each model 105 may have been trained using the same, or different, dataset 102.

The dataset 102 may include a plurality of feature vectors 109. Each feature vector 109 may be a set of values. The models 105 may be trained to receive as an input a feature vector 109 and to output a determined class or class value. Depending on the embodiment, each class may have a binary value (e.g., 0 or 1), or may have multiple possible values.

As shown, the surrogate model engine 110 includes several components or modules including, but not limited to, a model selector 120, a neighborhood selector 130, a model combiner 140, and a heatmap generator 150. More or fewer models may be supported. While shown as part of the surrogate model engine 110, each component or module may be implemented on a same or different computing device as the surrogate model engine 110. A suitable computing device is the computing device 400 illustrated with respect to FIG. 4.

The model selector 120 may select a plurality of models 105 for consideration. The models 105 may be linear models 105. The model selector 120 may select n models 105 (or interpretations) where all interpretations are concurrent for a same observation of interest 107. The observation of interest 107 may selected from the dataset 102. In particular, the model selector 120 may select n local linear models 105 where $y_i = \phi_i(m_i \vec{x} + b_i)$ for $1 \leq i \leq n$, and where all n interpretations are for the same observation of interest 107 ($\vec{x}*, y*$). In some embodiments, all of the models 105 may be the same model 105.

The neighborhood selector 130 may select points (i.e., feature vectors 109) from the dataset 102 that are close to the observation of interest 107. In particular, the neighborhood selector may select points that are within a selected distance of the observation of interest 107 in the dataset 102. Depending on the embodiment, the points may be randomly selected from the dataset 102. Other methods for selecting the points may be used. The points or feature vectors 109 that are selected are referred to herein as the neighborhood of the observation of interest 107.

In some embodiments, the neighborhood selector 130 may determine the distance of a point z to the observation of interest 107 using the function $\pi_{\vec{x}*}(z) = \exp(-\int(D(\vec{x}*, z)))$, where $D(\vec{x}*, z)$ is the distance of Z from $\vec{x}*$, and $\int$ is a damping function based on the application. In one embodiment, the damping function may be: $\int(D(\vec{x}*, z)) = -D(\vec{x}*, z)^2/\sigma^2$ for some user defined D and σ. Other damping functions may be used.

The neighborhood selector 130 may select points that are within a distance E of the observation of interest 107 for the neighborhood of the observation of interest 107. The ε-faithful neighborhood $\vec{x}*$ (of the observation of interest 107) is defined as the set of all points z for which $\pi_{\vec{x}*}(z) \geq \epsilon$ where ε is chosen based on the application that the resulting surrogate model 145 may be used.

The model combiner 140 may use the feature vectors 109 corresponding to the points in the neighborhood to combine the models 105 into a surrogate model 145. Depending on the embodiment, the surrogate model 105 may be one or more of a mean local surrogate model or a linearly weighted local surrogate model. How the model combiner 140 generates each type of surrogate model 145 is described below.

With respect to the mean local surrogate model, the model combiner 140 may use each of the models 105 to generate output classes y based on each of the feature vectors 109 in the neighborhood. The model combiner 140 may then use the output classes and feature vectors 109 to generate the local surrogate model 145. The mean local surrogate model 145 may be represented by the following equation (1):

$$y_{mean} = \phi_{mean}(m_q x + b_q) \text{ where} \qquad (1)$$

$$m_q = \frac{1}{n}\sum_{k=1}^{n} m_i, b_q = \frac{1}{n}\sum_{k=1}^{n} b_i, \text{ and}$$

$$\phi_{mean}(z) = \text{Majority}_{i=1}^{n}\{\phi_i(z)\}$$

(breaking ties arbitrarily). The observation of interest 107 ($\vec{x}*, y*$) satisfies equation (1) for all models 105 that agree with the majority prediction.

With respect to the linearly weighted local surrogate model, the model combiner 140 may similarly generate the classes y. The model combiner 140 may then create the linear-weighted local surrogate model 145 based on the classes y, the feature vectors 109, and the linear models 105. For purposes of simplification, the process is described for combining only two models 105. For a first model 105, a hypothetical point (i.e., feature vector 109) above the line $m_1 \vec{x} + b_1$ would be placed in a class 1, while a hypothetical point below the line would be placed in a class 0. For a second model 105, a hypothetical point above the line $m_2$ $\vec{x}+b_2$ would be placed in a class 0, while a hypothetical point below the line would be placed in a class 1. The linear-weighted local surrogate model 145 may be represented by the following equation (2):

$$y_{weight} = \phi_{weight}(\vec{x}) = \begin{cases} \phi_i(m_1\vec{x}+b_1) \text{ with probability } p_1(\vec{x}) \\ \phi_i(m_2\vec{x}+b_2) \text{ with probability } 1-p_1(\vec{x}) \end{cases} \quad (2)$$

where $p_1(\vec{x})$ is proportional to the inverse of the distance of point $\vec{x}$ from the line $m_1\vec{x}+b_1$. To avoid a division by zero error, the model combiner may use a smoothing parameter $\tau>0$.

Let $d_1(\vec{x})$ represent the perpendicular distance of $\vec{x}$ from the line $m_1\vec{x}+b_1$, and let $$w_i(\vec{x}) = \frac{1}{d_i(\vec{x}) + \tau}.$$

Thus, $$p_1(\vec{x}) = \frac{w_1(\vec{x})}{\sum_{j=1}^2 w_j(\vec{x})}$$

assuming there are who classes (i.e., class 1 and class 0).

The equation (2) may be extended to allow the model combiner 140 to combine more than two linear models 105. Given n interpretations $y_1(\vec{x}) = \phi_i(m_i\vec{x}+b_i)$ for $1 \leq i \leq n$, the weighted model $\phi_{weight}(\vec{x})$ reports the outcome of $y_1(\vec{x})$ with probability $p_1(\vec{x})$ is proportional to the inverse of the distance of point $(\vec{x})$ from the line $m_i\vec{x}+b_i$. In addition, $$p_1(\vec{x}) = \frac{w_i(\vec{x})}{\sum_{j=1}^n w_j(\vec{x})}, \text{ where } w_i(\vec{x}) = \frac{1}{d_i(\vec{x}) + \tau}.$$

Based on the above, the linear-weighted local surrogate model 145 may be represented by the following equation (3):

$$y_{weight} = \phi_{weight}(\vec{x}) = \begin{cases} \phi_i(m_1\vec{x}+b_1) \text{ with probability } p_1(\vec{x}) \\ \vdots \qquad \vdots \\ \phi_i(m_2\vec{x}+b_2) \text{ with probability } p_n(\vec{x}) \end{cases} \quad (3)$$

To compute the probability that the surrogate model 145 returns a class value C given a point $\vec{x}$, the probabilities of all models 105 that return the class value C given $\vec{x}$ can be computed by the model combiner 145 as shown in equation (4):

$$Pr(\phi_{weight} = c) = \sum_{\substack{1 \leq i \leq n \\ s.t. y_i(\vec{x})=c}} p_i(\vec{x}) \quad (4)$$

The heatmap generator 150 may generate a heatmap 155 that visualizes the output of a surrogate model 145, and more specifically a linearly weighted local surrogate model 145. A heatmap 155 is a way to visualize the classes output by the surrogate model 145 for each point (i.e., feature vectors 109). The heatmap 155 may include a color for each class value with an intensity that is based on the probability that the particular class value is returned by the surrogate model 145. The probability of a particular class value may be determined by the heatmap generator 150 using the equation (4) shown above.

For example, for a surrogate model 145 that outputs the class values of 1 or 0, the heatmap generator 150 may assign the color pink to the class 1 and the color blue to the class 0. If the surrogate model 145 for a point outputs the class value 1 with a probability of 0.2 and the class value 0 with a probability of 0.8, then the heatmap generator 150 may color the point on the heatmap 155 blue since it is most likely associated with the class value of 0. The heatmap generator 150 may color the point with a high intensity (e.g., dark blue) because the probability of the class value is high. Depending on the embodiment, the lowest intensity color used in the heatmap 155 may correspond to the probability of 0.5. Any method for generating a heatmap 155 may be used.

The surrogate models 145 described herein may be used for the following applications. Other applications may be supported. One example application is for the combination of interpretations from multiple different classifiers. There may be two classifiers $C_1$ and $C_2$ trained on the same dataset 102 and representing two classes: blue and red. As an example, the datasets could be made up of textual reviews such as movie reviews, and the reviews in the dataset may be labeled based on whether the review was positive or negative. The model combiner 140 may generate a surrogate model 145 $\xi_1(\vec{x})$ for $C_1$ and a surrogate model $\xi_2(\vec{x})$ for $C_2$ for the observation of interest 107 $(\vec{x})$. The following inferences may be drawn about the combined surrogate models 145:

1. All of the red points in the associated heatmap 155 (independent of intensity) may represent the regions of the feature space that favor classification into the red class. Similarly, the blue points represent regions of the feature space that favor classification into the blue class.
2. The darker the point (i.e., higher the intensity) on the heatmap 155, the greater the likelihood that $\xi_1(\vec{x})$ and $\xi_2(\vec{x})$ agree on that point and the higher the confidence in the classification, and vice versa.
3. For points with low intensity, the two interpreters provide conflicting class outputs. Assuming at least two interpretations, points that are equidistant from the two models may have the lowest intensity.

Another application for the surrogate models 145 is to identify key features in a dataset 102 that are responsible for the classification. For example, the high intensity regions of the heatmap 155 are evidence of agreement among the combined models 145. The particular feature vectors 109 from these regions may be used to identify the key features used for classification. For example, if all of the models 105 agree that certain conversations between customers and agents be escalated, then these conversations likely include key features that are causing the classification.

Another use for the surrogate models 145 is for purposes of data generation or for fixing erroneous labels in datasets 102. For applications that require data generation, the regions of the heatmap 155 with high interpreter agreement may produce ample data points for this task with sufficient classifier confidence. In the chatbot setting, surrogate models 145 may allow for the generation of transcripts that are likely to escalate, even if they have never been seen in any of the training/testing examples. This may help in further identifying features which may have been missed while designing the original models 105.

The ability to generate new datapoints for a dataset 102 with sufficient confidence about their classification has possible applications in fixing erroneous training labels (if the error rate is not too high). For example, if the training dataset 102 contains an example for which the label is different than the output of the surrogate model 145, this may indicate that here is a problem in the dataset 102.

As another example, the surrogate models described herein can be used to identify areas or applications where linear models 105 tend to disagree or agree and therefore may not be suitable for prediction. For example, if the surrogate model 145 (through the heatmap 155) shows that the linear models 105 tend to agree (i.e., high intensity colors on the heatmap 155) on whether or not certain calls should be escalated to a customer service agent, then this may indicate that call escalation is an area that is well suited to automation and/or classification. On the other hand, if the surrogate model 145 shows that the linear models 105 do not agree (i.e., low-intensity colors on the heatmap 155) on whether an online review is positive or negative, then this may indicate that review classification is an area that is not well-suited for automation.

Continuing the above example, the combined surrogate model 145 may further indicate whether the particular set of features that are being used for classification by each underlying linear model 105 is sufficient for classification purposes. For example, if the surrogate model 145 models show that the linear models 105 tend to agree when classifying call transcripts for escalation, then it may be assumed that the particular feature vectors being used for classification are adequately capturing the characteristics of the call transcripts that are important for classification. Conversely, if the surrogate model 145 models show that the linear models 105 tend to disagree when classifying reviews as positive or negative, then it may be assumed that the particular feature vectors being used for review classification are not adequately capturing the characteristics of the reviews that are important for classification.

In some embodiments, the model combiner 145 may generate surrogate models 145 using the various models 105 used by a call center for different classification purposes. For example, the model combiner 140 may generate a surrogate model 145 using the various models 105 used for call escalation purposes, may generate a surrogate model 145 using the various models 105 that are used to classify the tone or emails or other written communications, and may generate a surrogate model 145 using the various models 105 that are used review the performance of agents. If the model combiner 140 determines that the generated surrogate model 145 for a particular group of linear models 105 do not agree by more than a threshold amount, the model combiner 140 may alert an administrator that the use of the linear models 105 may be reconsidered or reevaluated.

Figure 2:
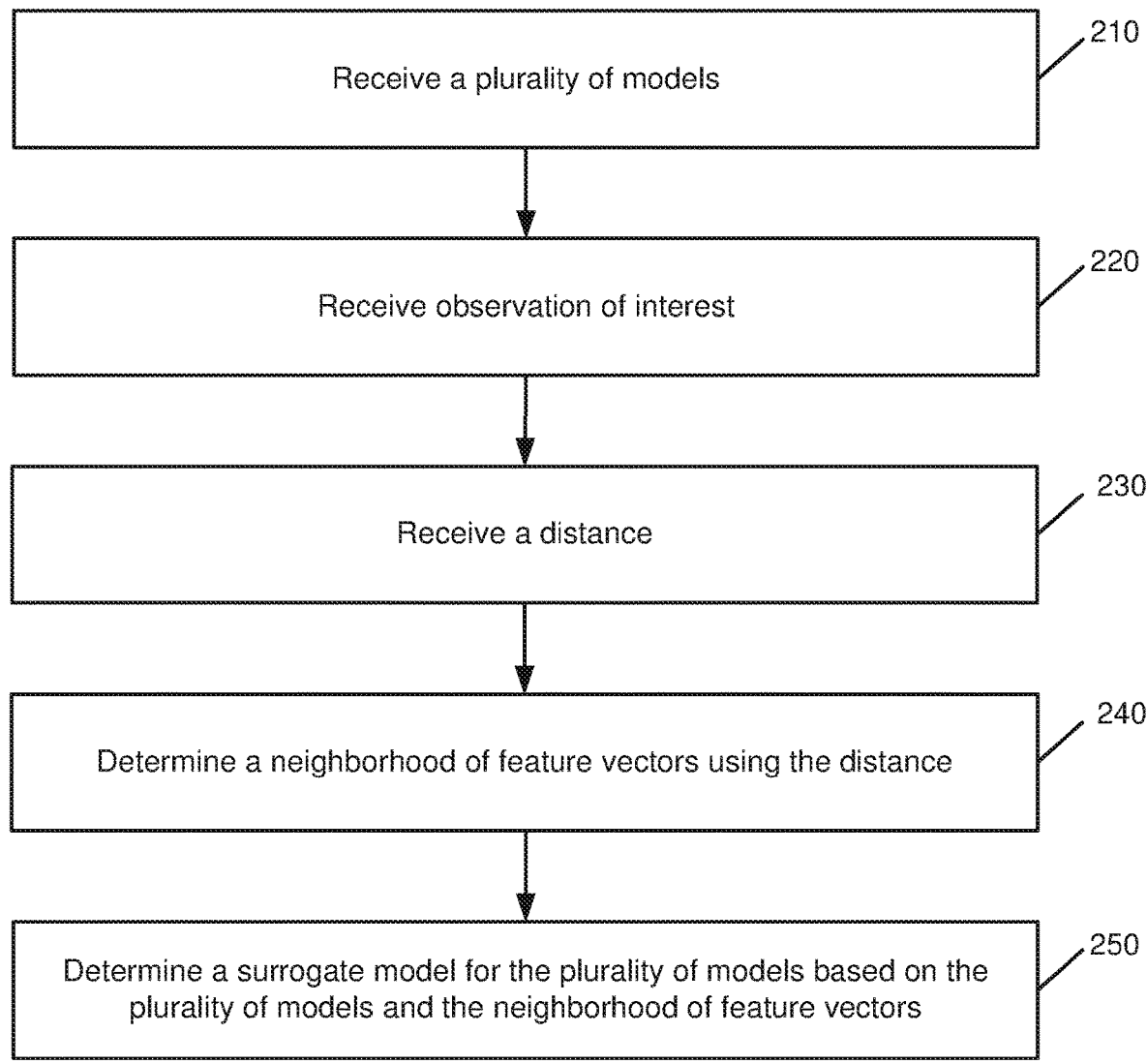
FIG. 2 is an operational flow of an implementation of a method for determining a surrogate model.

FIG. 2 is an operational flow of an implementation of a method 200 for determining a surrogate model. The method 200 may be implemented by the surrogate model engine 110.

At 210, a plurality of models is received. The plurality of models 105 may be received and/or selected by the model selector 210. Each model 105 may be a linear model 105. The models 105 may be classifiers and may output a class value in response to an input such as a feature vector 109. The models 105 may have been trained using feature vectors 109 from a dataset 102.

At 220, an observation of interest is received. The observation of interest 107 may be received by the neighborhood selector 130. The observation of interest 107 may be a feature vector 109 and a class value output for the feature vector 109 by each model 105 of the plurality of models 105. That is, each model 105 may be concurrent with respect to the observation of interest 107.

At 230, a distance is received. The distance may be received by the neighborhood selector 130. The distance may be set by a user or administrator.

At 240, a neighborhood of feature vectors is determined. The neighborhood of feature vectors 109 may be determined by the neighborhood selector 130 by selecting or sampling feature vectors 109 from the dataset 102 that are within the received distance of the feature vector 109 of the observation of interest 107 in the dataset 102. Any method for determining the distance of feature vectors 109 in the dataset 102 may be used.

At 250, a surrogate model for the plurality of models is determined. The surrogate model 145 may be determined by the model combiner 140. The surrogate model 145 may be one or more of a mean local linear surrogate model or a linearly weighted local surrogate model. Other types of surrogate models 145 may be supported. In some embodiments, the model combiner 140 may determine the surrogate model 145 using each model 105 of the plurality of models 105 and the feature vectors 109 of the neighborhood of feature vectors 109 according to one or more of the equations (1) and (3) described above.

Figure 3:
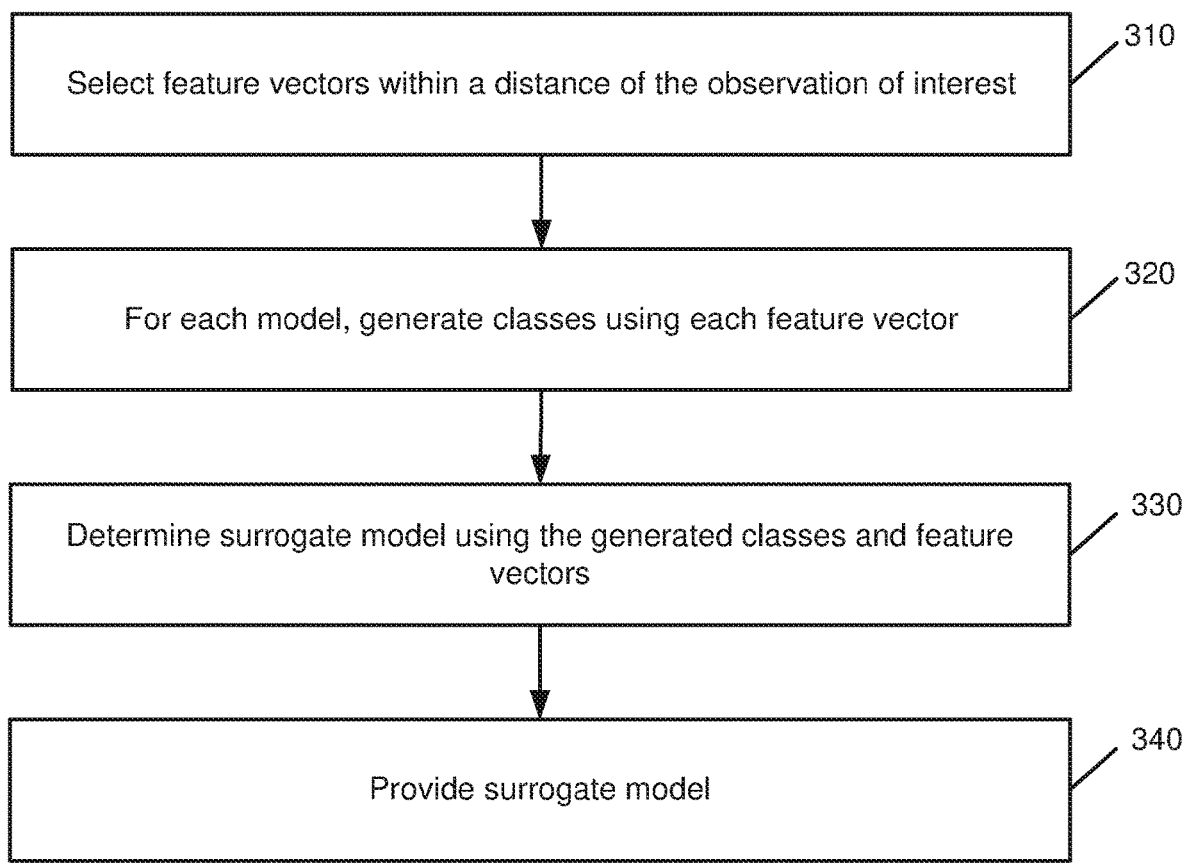
FIG. 3 is an operational flow of an implementation of a method for determining a surrogate model.

FIG. 3 is an operational flow of an implementation of a method 300 for determining a surrogate model. The method 300 may be implemented by the surrogate model engine 110.

At 310, feature vectors within a distance of an observation of interest are selected. The feature vectors 109 may be selected by the neighborhood selector 130. Depending on the embodiment, the feature vectors 109 may be selected or sampled from the dataset 102. The feature vectors 109 may be selected according to a damping function that is selected according to the application that will use the surrogate model 145 or the types of linear models 105 that are being combined. The selected feature vectors 109 are the neighborhood of feature vectors 109.

At 320, classes are generated using each feature vector 109 for each model. The classes or class values may be generated by the model combiner 140. Depending on the embodiment, each model 105 may be used to output a class for each of the feature vectors 109 of the neighborhood of feature vectors 109.

At 330, the surrogate model is determined using the generated classes and feature vectors. The surrogate model 145 may be generated by the model combiner 140. Depending on the embodiment, the model combiner 140 may use the classes output by each model 105 to determine the surrogate model 145 as described above depending on whether the surrogate model 145 is a local linear surrogate model or a linearly weighted local surrogate model.

At 340, the surrogate model is provided. The surrogate model 145 may be provided by the model combiner 140. Depending on the embodiment, the surrogate model 145 may be provided to the heatmap generator 150 for use in creating on one more heatmaps 155.

Figure 4:
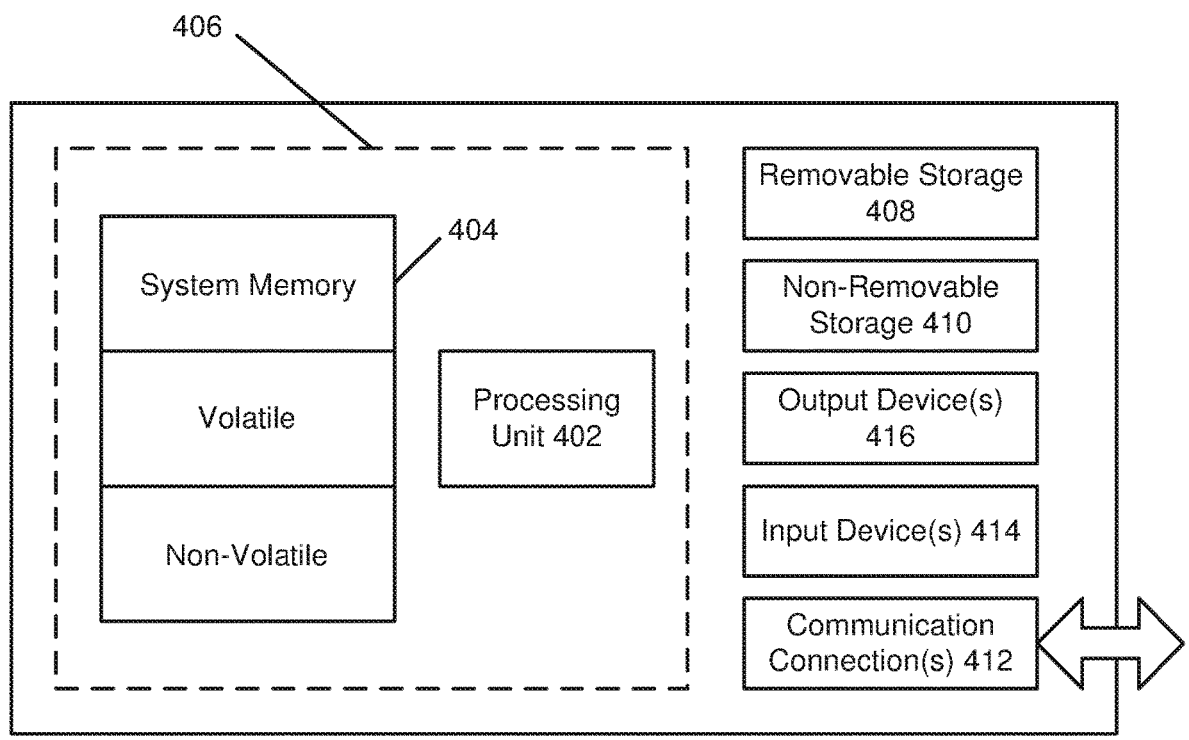
FIG. 4 shows an exemplary computing environment in which example embodiments and aspects may be implemented.

FIG. 4 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by the device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 400.

Computing device 400 may contain communication connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for determining a surrogate model from a plurality of models comprising:
   receiving a dataset by the computing device;
   training a plurality of models to evaluate customer interactions for customer service purposes using machine learning by the computing device, wherein each model of the plurality of models is trained using the same data from the dataset, and further wherein each model receives as an input a feature vector and generates a class value for a same class based on the input feature vector;
   selecting an observation of interest by the computing device, wherein the observation of interest includes a respective feature vector and a respective class value, and wherein all of the models of the plurality of models are concurrent at the observation of interest;
   determining a neighborhood of feature vectors by the computing device, wherein the neighborhood of feature vectors comprises a plurality of feature vectors that are within a selected distance from the observation of interest in the dataset;
   determining a surrogate model for the plurality of models based on the neighborhood of feature vectors and the plurality of models by the computing device, wherein the surrogate model receives as an input a corresponding feature vector and generates a corresponding class value for the same class based on the input feature vector;

using the surrogate model to evaluate customer interactions by the computing device; and generating a heatmap by the computing device, wherein the heatmap is indicative of: (i) a degree of correspondence between a respective output of each of the plurality of models, and (ii) suitability of each of the plurality of models for evaluating the customer interactions for customer service purposes.

2. The method of claim 1, wherein the surrogate model is one or more of a mean local linear surrogate model or a linear weighted local linear surrogate model.

3. The method of claim 1, wherein determining the surrogate model for the plurality of models based on the neighborhood of feature vectors and the plurality of models comprises:

determining the surrogate model using a set of class values generated by each linear model for each feature vector of the neighborhood of feature vectors.

4. The method of claim 1, wherein the models of the plurality of models are linear models.

5. The method of claim 1, further comprising:

in response to identifying at least one region of the heatmap where the degree of correspondence meets or exceeds a confidence threshold, generating a new training dataset by the computing device based on one or more features associated with the at least one region, wherein the new training dataset comprises customer interactions that are likely to escalate.

6. A system for determining a surrogate model from a plurality of models comprising:

at least one processor; and a non-transitory computer readable medium storing instructions that when executed by the at least one processor cause the system to:

receive a dataset;

train a plurality of models to evaluate customer interactions for customer service purposes using machine learning, wherein each model of the plurality of models is trained using the dataset, and further wherein each model receives as an input a feature vector and generates a class value for a same class based on the input feature vector;

select an observation of interest, wherein the observation of interest includes a respective feature vector and a respective class value, and wherein all of the models of the plurality of models are concurrent at the observation of interest;

determine a neighborhood of feature vectors, wherein the neighborhood of feature vectors comprises a plurality of feature vectors that are within a selected distance from the observation of interest in the dataset;

determine a surrogate model for the plurality of models based on the neighborhood of feature vectors and the plurality of models, wherein the surrogate model receives as an input a corresponding feature vector and generates a corresponding class value for the same class based on the input feature vector;

use the surrogate model to evaluate customer interactions for customer service purposes; and generate a heatmap, wherein the heatmap is indicative of: (i) a degree of correspondence between a respective output of each of the plurality of models, and (ii) suitability of each of the plurality of models for evaluating the customer interactions for customer service purposes.

7. The system of claim 6, wherein the surrogate model is one or more of a mean local linear surrogate model or a linear weighted local linear surrogate model.

8. The system of claim 6, further comprising instructions that when executed by the at least one processor cause the system to:

determine the surrogate model using a set of values generated by each linear model for each feature vector of the neighborhood of feature vectors.

9. The system of claim 6, wherein the models of the plurality of models are linear models.

10. A non-transitory computer readable medium storing instructions that when executed by at least one processor of a system cause the system to:

receive a dataset;

train a plurality of models to evaluate customer interactions for customer service purposes using machine learning, wherein each model of the plurality of models is trained using the dataset, and further wherein each model receives as an input a feature vector and generates a class value for a same class based on the input feature vector;

select an observation of interest, wherein the observation of interest includes a respective feature vector and a respective class value, and wherein all of the models of the plurality of models are concurrent at the observation of interest;

determine a neighborhood of feature vectors, wherein the neighborhood of feature vectors comprises a plurality of feature vectors that are within a selected distance from the observation of interest in the dataset;

determine a surrogate model for the plurality of models based on the neighborhood of feature vectors and the plurality of models, wherein the surrogate model receives as an input a corresponding feature vector and generates a corresponding class value for the same class based on the input feature vector;

use the surrogate model to evaluate customer interactions; and generate a heatmap, wherein the heatmap is indicative of: (i) a degree of correspondence between a respective output of each of the plurality of models, and (ii) suitability of each of the plurality of models for evaluating the customer interactions for customer service purposes.

11. The computer readable medium of claim 10, wherein the surrogate model is one or more of a mean local linear surrogate model or a linear weighted local linear surrogate model.

* * * * *